United States Patent
Van Der Burgt

(10) Patent No.: US 11,015,054 B2
(45) Date of Patent: May 25, 2021

(54) FLAME RETARDANT POLYAMIDE COMPOSITION

(71) Applicant: DSM IP ASSETS B.V., Heerlen (NL)

(72) Inventor: Frank Peter Theodorus Johannes Van Der Burgt, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 133 days.

(21) Appl. No.: 15/857,194

(22) Filed: Dec. 28, 2017

(65) Prior Publication Data

US 2018/0118937 A1     May 3, 2018

Related U.S. Application Data

(62) Division of application No. 14/234,288, filed as application No. PCT/EP2012/064467 on Jul. 24, 2012, now abandoned.

(30) Foreign Application Priority Data

Jul. 27, 2011   (EP) .................................... 11175489

(51) Int. Cl.
| | | |
|---|---|---|
| C08L 77/06 | (2006.01) | |
| C08K 5/5313 | (2006.01) | |
| C08K 7/14 | (2006.01) | |
| B29C 45/00 | (2006.01) | |
| C08J 5/00 | (2006.01) | |
| B29K 77/00 | (2006.01) | |
| B29L 31/36 | (2006.01) | |

(52) U.S. Cl.
CPC .......... *C08L 77/06* (2013.01); *B29C 45/0001* (2013.01); *C08J 5/00* (2013.01); *C08K 5/5313* (2013.01); *C08K 7/14* (2013.01); *B29K 2077/00* (2013.01); *B29L 2031/36* (2013.01); *C08J 2377/06* (2013.01); *C08J 2477/06* (2013.01); *C08L 2201/02* (2013.01); *C08L 2205/02* (2013.01); *C08L 2205/025* (2013.01)

(58) Field of Classification Search
CPC ......... C08K 5/5313; C08K 7/14; C08L 77/06; C08J 5/00; B29C 45/0001
USPC ......................................................... 524/133
See application file for complete search history.

(56) References Cited

U.S. PATENT DOCUMENTS

| | | |
|---|---|---|
| 2001/0008913 A1 | 7/2001 | Flippo |
| 2006/0020064 A1 | 1/2006 | Bauer |
| 2008/0262193 A1 | 10/2008 | Kurose et al. |
| 2009/0029138 A1 | 1/2009 | Miyoshi |
| 2009/0275683 A1 | 11/2009 | Lee et al. |
| 2010/0249292 A1 | 9/2010 | Saga et al. |
| 2010/0279550 A1* | 11/2010 | Rulken ................ C08G 69/265 439/625 |
| 2011/0105655 A1 | 5/2011 | Harder et al. |
| 2011/0257313 A1 | 10/2011 | Seki |
| 2012/0172512 A1 | 7/2012 | Ishii et al. |

FOREIGN PATENT DOCUMENTS

| | | |
|---|---|---|
| EP | 2025710 | 2/2009 |
| EP | 2256167 | 1/2010 |
| JP | 6-49356 | 2/1994 |
| JP | 6-287439 | 10/1994 |
| JP | 2000-63664 | 2/2000 |
| JP | 2002-105333 | 4/2002 |
| JP | 2002-284991 | 10/2002 |
| JP | 2003-127304 | 5/2003 |
| JP | 2004-149791 | 5/2004 |
| JP | 2004-292695 | 10/2004 |
| JP | 2004-300189 | 10/2004 |
| JP | 2006-504833 | 2/2006 |
| JP | 2006-111859 | 4/2006 |
| JP | 2007-161963 | 6/2007 |
| JP | 2007-182550 | 7/2007 |
| JP | 2007-217619 | 8/2007 |
| JP | 2007-217620 | 8/2007 |
| JP | 2008-280535 | 11/2008 |
| JP | 2009-041016 | 2/2009 |
| JP | 2009-263461 | 11/2009 |
| JP | 2009-270107 | 11/2009 |
| JP | 2010-037372 | 2/2010 |
| JP | 2010-513652 | 4/2010 |
| JP | 2011-57977 | 3/2011 |

(Continued)

OTHER PUBLICATIONS

International Search Report for PCT/EP2012/064467 dated Aug. 29, 2012.

(Continued)

*Primary Examiner* — Doris L Lee

(74) *Attorney, Agent, or Firm* — Nixon & Vanderhye P.C.

(57) ABSTRACT

Flame retardant polyamide compositions comprise (A) a semi-crystalline semi-aromatic polyamide having a melting temperature (TmA) and having a number average molecular weight in the range between 7,500 and 30,000 g/mol; (B) a semi-crystalline aliphatic polyamide having a melting temperature (TmB); and having a number average molecular weight in the range between 7,500 and 50,000 g/mol; and (C) a halogen free flame retardant system comprising a metal salt of a phosphinic acid and/or a diphosphinic acid, wherein TmA is higher than TmB and weight ratio of (A):(B) is in the range between 50:50 and 75:25. Process for moulding the flame retardant polyamide composition, and moulded parts made of the flame retardant polyamide composition are also provided.

11 Claims, No Drawings

(56) References Cited

FOREIGN PATENT DOCUMENTS

| JP | 2006-522842 | 10/2016 |
| WO | 2009/110480 | 11/2009 |
| WO | 2010/073595 | 1/2010 |
| WO | 2010/014801 | 2/2010 |
| WO | 2010/081871 | 7/2010 |
| WO | 2011/030911 | 3/2011 |
| WO | WO 2012/156227 | 11/2012 |

OTHER PUBLICATIONS

Goto et al, Polyamide Resin Composition for Electrical and Electronic Components, Consists of Polyamide Resin, Melamine-Phosphoric Acid Addition Product, Specific Phosphoric and/or Diphosphine Acid Salt and Inorganic Filler, WPI/ Thomson, Oct. 28, 2004, vol. 2005, No. 2, XP002648553, and JP 2004 300189 dated Oct. 28, 2004 (attached).

Ellis, T.S. Influence of Structure on Phase Behavior of Polyamide Blends, Macromolecules 1991, 24, 2845-3852.

\* cited by examiner

FLAME RETARDANT POLYAMIDE COMPOSITION

This application is a divisional of commonly owned copending U.S. Ser. No. 14/234,288, filed Apr. 15, 2014 (now abandoned), which is the national phase application of International Application No. PCT/EP2012/064467, filed Jul. 24, 2012, which designated the U.S. and claims priority to EP 11175489.1, filed Jul. 27, 2011, the entire contents of each of which are hereby incorporated by reference.

The invention relates to a flame retardant polyamide composition, a process for moulding the flame retardant polyamide composition, and moulded parts made of the flame retardant polyamide composition.

The invention in particular relates to halogen free flame retardant moulding compositions for high performance applications. For high performance applications often semi-crystalline polyamides with high melting temperatures are used, if not excluded or prohibited by even higher temperature requirements. For the flame retardancy halogen free flame retardants can be used, although with such flame retardants it is more difficult to achieve the required flame retardancy level, compared to halogen containing flame retardants used in the past. Because of the high temperatures involved in either the processing and/or the applications of these moulding compositions, the selection of flame retardants that can be used is limited, and even the better performing flame retardants commercially available have their limitations and problems. This becomes even more pronounced in more critical applications involving large production series of precision parts with small dimensions.

A lot of attention is paid to the properties of the moulding compositions and the products produced thereof. First of all these moulding compositions should have high flow, the products should preferably have a good weld line strength, a good surface appearance, e.g. high gloss, staining free and blooming free, and have a good flame retardancy rating, such as according to UL94 test methods. The processing should preferably not induce corrosion of the injection moulding equipment.

But an important aspect that should not be overlooked for large scale production series is a smoothly running if not flawless injection moulding process that does not have to be regularly interrupted for clean-up of the mould, as this would drastically reduce the throughput of the injection moulding process and the economic utilisation of the equipment. An important aspect herein is the occurrence of what is called plate-out. Plate-out is the outgassing of solid material from the moulding composition and deposition thereof inside the mould. Accumulation of such deposition can block the outgassing openings of the mould. This becomes apparent from burning spots on the moulded parts: through fast injection of the moulding material in the mould, the gas comprised by the mould cannot escape and gets compressed quickly, resulting in heating up of the gas to such high temperatures that the parts can get burned.

Plate out is different from blooming or staining. Blooming is the migration of solid material from the composition to the surface after exposure of a moulded part to hot and humid conditions. Staining is the migration of solid material from a composition to the surface upon contacting of a moulded part with a liquid.

The aim of the present invention is to provide a halogen free flame retardant moulding composition that has a good balance in properties, and has a good plate out performance. Preferably, the moulded parts made of the composition also have a good surface appearance and low tendency for blooming and staining.

This aim has been achieved with the composition according to the invention comprising
 (A) a semi-crystalline semi-aromatic polyamide (referred to as polyamide (A), or (A)) having a melting temperature (referred to as TmA) and having a number average molecular weight (referred to as Mn-B) in the range between 7,500 and 30,000 g/mol;
 (B) a semi-crystalline aliphatic polyamide (referred to as polyamide (B), or (B)) having a melting temperature (referred to as TmB); and having a number average molecular weight (referred to as Mn-B) in the range between 7,500 and 50,000 g/mol; and
 (C) a halogen free flame retardant system comprising a metal salt of a phosphinic acid and/or a diphosphinic acid (together referred to as metal (di)phosphinate),
 wherein
  the TmA is higher than TmB and
  the weight ratio of (A):(B) is in the range between 50:50 and 75:25.

The effect of the composition according to the invention, comprising the above combination of components with the said features is that the composition can be moulded at less severe moulding conditions than corresponding compositions based on a semi-aromatic polyamide only, while still having a good flow at those moulding conditions and resulting in moulded parts with good flame retardancy properties, weld strength and surface appearance, and most importantly reduced plate out, when compared with the corresponding compositions only based on a semi-aromatic polyamide, or when compared with corresponding compositions only based on an aliphatic polyamide composition even though said composition would still not have a comparable flame retardancy level. The flow of the semi-aromatic polyamide based composition could be improved by using aliphatic polyamides with lower Mn, which can be used in lower amounts, but this results in loss of flame retardancy properties. Alternatively the flow of the semi-aromatic polyamide based composition could be increased by using higher processing temperatures but this would result in even more extensive plate out. Combining an aromatic polyamide and an aliphatic polyamide in a ratio beyond the above range, and/or with number average molecular weights beyond the ranges indicated above for the invention does not solve the problem of plating and/or introduces other problems, such as loss in flame retardancy properties and/or insufficient flow and surface appearance.

Preferably, the semi-crystalline semi-aromatic polyamide (A) has a number average molecular weight (Mn-A) of in the range of 10,000-25,000 g/mol, more preferably in the range of 12,500-20,000 g/mol. Also preferably, the semi-crystalline aliphatic polyamide (B) has a number average molecular weight (Mn-B) in the range of 10,000-40,000 g/mol, more preferably in the range of 15,000-30,000 g/mol. A higher Mn has the advantage that the flame retardancy is better retained, while the advantage of a lower Mn is that plate out is further reduced.

The number average molecular weight (Mn) as referred to herein is determined by measuring the molecular weight distribution by gel permeation chromatography (GPC), more particular with Size Exclusion Chromatography (SEC) combined with triple detection method. Herefor a GPC apparatus is coupled to viscometry, refractive index and light scattering detection (90 degrees). The measurements are performed using hexafluoroisopropanol comprising 0.1 wt % potassium trifluoro acetate, relative to the weight of the hexafluoroisopropanol, as solvent, and employing a Size Exclusion Chromatograph equipped with 3 PFG linear XL silica columns; The weight average molecular weight is calculated from the measured molecular weight distribution using TriSEC 3.0 software of the company Viscotek. The Mn and Mw are expressed in g/mol. The triple detection method has the advantage in that this method gives absolute values and does not need an external reference.

For the semi-crystalline semi-aromatic polyamide (A) in principle any semi-crystalline semi-aromatic polyamide used for making moulding compositions can be used. Suitably (A) comprises repeat units derived from terephthalic acid, and optionally another aromatic dicarboxylic acid and/or aliphatic dicarboxylic acid, and aliphatic diamines selected from aliphatic linear or branched diamines comprising 4-12 carbon atoms. An aromatic dicarboxylic acid that suitably is combined with terephthalic acid is, for example, isophthalic acid. An example of an aliphatic dicarboxylic acid, that can be combined with terephthalic acid, and optionally with the other aromatic dicarboxylic acid, in the semi-crystalline semi-aromatic polyamide (A) is adipic acid.

The semi-crystalline semi-aromatic polyamide (A) suitably has a high melting temperature. Preferably Tm-A is at least 270° C., more preferably at least 280° C. Still more preferably Tm-A is in the range of 290-350° C., or even better at least 300-340° C. A higher melting temperature for polyamide (A) results in a product with better retention of mechanical and other properties at high temperature. The product can nevertheless be processed at such process conditions that a good flame retardancy and low plate out is achieved.

With the term melting temperature is herein understood the melting temperature (Tm) as determined by the method according to ISO-11357-3.2, 2009, in an N2 atmosphere with a heating and cooling rate of 10° C./min, from the peak value of the melting peak in the second heating cycle. In case there are multiple melting peaks, the peak value is to be taken from the highest melting peak.

A semi-crystalline semi-aromatic polyamide with a higher melting temperature can generally be achieved by using a higher content in terephthalic acid and/or shorter chain diamines in the polyamide. The person skilled in the art of making polyamide moulding compositions will be capable of making and selecting such polyamides. Suitable examples include PA8T, PA9T, PA10T, PA12T, PA6T/6I, PA6T/66, PA6T/46, and copolyamides thereof.

The semi-crystalline aliphatic polyamide (B) also suitably has a high melting temperature, though always remaining blow that of (A). Suitably, Tm-B is at least 220° C. Preferably Tm-B is in the range of 250-300° C.

For the semi-crystalline aliphatic polyamide (B) also a wide variety of polyamides can be used. To obtain a product with good high temperature properties, preferably a polyamide with a high melting point is used such as either polyamide 4,6, polyamide 4,8, polyamide 4,10, or polyamide 6,6 or any mixture or copolymer thereof.

In a preferred embodiment of the flame retardant polyamide composition according to the invention, the weight ratio of (A):(B) is in the range of 55:45-72.5:27.5.

Most favourably the semi-crystalline semi-aromatic polyamide (A) and the semi-crystalline aliphatic polyamide (B) used in the composition according to the invention are at least miscible with each other to a certain extend. In that respect it is preferred that (A) and (B) have a negative X parameter. Herein X is the miscibility parameter $X_{blend}$ calculated for (A) and (B) following the method according to T. S. Ellis in Macromolecules 1991, 24, 3845-3852, using the following formula (III)

$$X_{blend} = [(1-x)(y-x) + z(x-y)]X_{AB} + \\ (1-y-z)(1-x-z)X_{BC} + (1-y-z)(x-y)X_{AC} \quad \text{Formula (III)}$$

The formula as used by Ellis is applicable for blends of aliphatic and semi-aromatic polyamides, defined as $A_xB_{1-x}/A_yB_zC_{1-y-z}$, where $A_xB_{1-x}$ represents the aliphatic polyamide and $A_yB_zC_{1-y-z}$ represents the aromatic polyamide, and wherein A, B and C represent the methylene, amide, and phenyl repeat units, x, 1-x, y, z and 1-y-z represent the relative amounts of these repeat units in the polyamides. For the calculations of $X_{blend}$, the parameters $X_{AB}$, $X_{AC}$ and $X_{BC}$, representing the interaction between methylene and amide, methylene and phenyl units, and amide and phenyl units respectively, were taken equal to respectively 7.982, −0.288 and 7.46, as determined by Ellis in above article.

Applying these values Formula III reduces to the following formula (IV)

$$X_{blend} = [(1-x)(y-x) + z(x-y)]*7.982 + \\ (1-y-z)(1-x-z)*7.46 - (1-y-z)(x-y)*0.288 \quad \text{Formula (IV)}$$

Suitable salts of (di)phosphinic acids that can be used in the composition according to the present invention are, for example, a phosphinate of the formula (I), a disphosphinate of the formula (II),

(I)

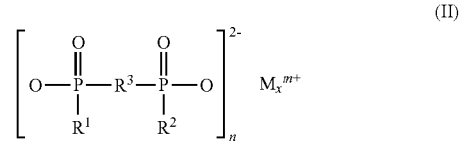

(II)

or polymers of these wherein $R^1$ and $R^2$ are identical or different or are $C_1$-$C_6$ alkyl, linear or branched, and/or aryl; $R^3$ is $C_1$-$C_{10}$-alkylene, linear or branched, $C_6$-$C_{10}$-arylene, -alkylarylene or -arylalkylene; M is one or more of calcium ions, magnesium ions, aluminum ions and zinc ions, m is 2 to 3; n is 1 or 3; x is 1 or 2. $R^1$ and $R^2$ may be identical or different and are preferably methyl, ethyl, n-propyl, isopropyl, n-butyl, tent-butyl, n-pentyl and/or phenyl. $R^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum ions or zinc ions. These compounds are disclosed in U.S. Pat. No. 6,255,371, which is hereby incorporated herein by reference.

Preferably the flame retardant system (C) comprises an aluminum (di)phosphinate. Suitable examples thereof are methylethyl(di)phosphinate and/or aluminum diethyl(di)phosphinate.

Suitably, flame retardant system (C) is present in an amount of 1-100 parts by weight (pbw) relative to 100 pbw of (A)+(B). Preferably, the amount of (C) is in the range of 5-50 parts by weight (pbw) relative to 100 pbw of (A)+(B).

The flame retardant system (C) is also suitably present in an amount in the range of at least 5 wt. % and/or at most 30 wt. %, more particular at least 5 wt. % and/or at most 25 wt. %. Herein the weight percentages (wt. %) are relative to the total weight of the flame retardant polyamide composition. Preferably, the amount of the metal (di)phosphinate comprised by the flame retardant polyamide composition is preferably in the range of 5-25 wt. %, more preferably 7.5-20 wt. %, relative to the total weight of the composition.

The composition may comprise one or more other flame retardants than the metal (di)phosphinates, and/or one or more flame retardant synergists. Flame retardant synergists generally used in combination with metal (di)phosphinate flame retardants include metal borates, such as Znborate and BaBorate.

In a preferred embodiment, the composition comprises at most 1 wt. %, more preferably at most 0.5 wt. %, and even better 0-0.1 wt. % ZnBorate. The advantage of a lower content or even absence of ZnBorate is that the staining of the composition is improved, compared to the corresponding composition comprising a higher ZnBorate content.

The polyamide composition of the present invention may optionally comprise further components, such as inorganic fillers, fibrous reinforcing agents, other polymers, as well as additives selected from, for example, acid scavengers, impact modifiers, plasticizers, stabilizers (such as, for example, thermal stabilizers, oxidative stabilizers, UV light stabilizers and chemical stabilizers), processing aids (such as, for example, mould release agents and nucleating agents), solid lubricants, colorants (such as carbon black, other pigments, dyes), nanoclays, etc. An impact modifier is advantageously included to further improve impact resistance for e.g. housings for electronic devices.

Examples of inorganic reinforcing agents and/or fillers, that the composition may optionally comprise, include one or more of glass fibres, which may be flat glass fibres, glass flakes, kaolin, clay, talc, mica, wollastonite, calcium carbonate, silica, carbon fibres, potassium titanate, etc. Glass fibres and carbon fibres are preferred.

The inorganic reinforcing agent and/or filler used in the present invention, if used at all, is suitably present in amount from, for example, about 5 wt. % up to about 60 wt. %, based on the total weight of the composition.

In a particular embodiment of the invention, the flame retardant polyamide composition comprises 5-25 wt. % of flame retardant (C), and 5-60 wt. % of glass or carbon fibre reinforcement, wherein the wt. % are relative to the total weight of the composition.

In a preferred embodiment, the total amount of fibrous reinforcing agents and fillers in the composition is in the range of 45-60 wt. %, for example about 50 wt. % or about 55 wt. %. Such a high amount is preferred in case a high stiffness is required, such as for example, for use in housings for electronic devices such as for notebooks, mobile phones and PC tablets.

In case a high flow is required, such as for connectors with a high aspect ratio, i.e. thin but relatively long as in DDR connectors, the amount of the inorganic reinforcing agents and/or fillers is suitably up to about 45 wt. %, or more preferably up to about 40 wt. %, based on the total weight of the composition.

In a particular embodiment of the invention, the flame retardant polyamide composition consists of (A)/(B) 30-90 wt. % of polyamide (A) and polyamide (B) in a weight ratio in the range between 50:50 and 75:25;
(C) 5-25 wt. % of metal(di)phosphinate;
(D) 0-60 wt. % of inorganic fillers and/or fibrous reinforcing agents;
(E) 0-40 wt. % of other components In a preferred embodiment thereof, the flame retardant polyamide composition consists of (A)/(B) 30-87 wt. % of polyamide (A) and polyamide (B) in a weight ratio in the range between 50:50 and 75:25.
(C) 7.5-20 wt. % of metal(di)phosphinate
(D) 5-55 wt. % of inorganic fillers and/or fibrous reinforcing agents;
(E) 0.5-20 wt. % of other components Herein the weight percentages (wt. %) are relative to the total weight of the composition, and the sum of (A)-(E) is 100%.

The compositions according to the invention can be prepared by a process, wherein the semi-aromatic polyamide, the aliphatic polyamide, the flame retardant system and optional additional ingredients are melt-blended. Part of the materials may be mixed in a melt-mixer, and the rest of the materials may then be added and further melt-mixed until uniform. Melt-blending may be carried out using any appropriate method known to those skilled in the art. Suitable methods may include using a single or twin-screw extruder, blender, kneader, Banbury mixer, moulding machine, etc. Twin-screw extrusion is preferred, particularly when the process is used to prepare compositions that contain additives such as flame retardants, and reinforcing agents. The compositions of the present invention have a high melt flow and may be conveniently formed into a variety of articles using injection moulding, rotomoulding and other melt-processing techniques. The articles are useful in SMT applications among others and include connectors, such as memory cards, (CPU) sockets, I/O, FPC, motherboard and automotive connectors, and housings and stiffener frames for electronic devices, for example housings and stiffener frames for notebooks, mobile phones, stiffeners and PC tablets.

The invention also relates to a process for the production of moulded parts from the flame retardant polyamide composition according to the invention, or any embodiment thereof, as described above, by injection moulding, comprising a step wherein the composition is heated in an injection moulding machine to form a polymer melt. In said process, the melt is heated to a temperature of at most 10° C. above TmA, i.e. above the melting temperature of the semi-crystalline semi-aromatic polyamide comprised by the composition. The effect thereof is that the plate out is reduced, while simultaneously achieving the other properties as described above In a preferred embodiment of the said process, the polymer melt is injected into a mould with a mould temperature of at least 100° C. Preferably the temperature of the mould is in the range of 110-150° C. A mould temperature of 100° C. and higher has the advantage that the resulting product has an improved gloss.

The invention also relates to an article or moulded product made from a composition according to the present invention, or any specific embodiment thereof. Suitably, the article is a plastic part of a connector or a housing or stiffener frame for an electronic device.

The invention is further illustrated with the following examples and comparative experiments.

Materials

PPA PA4T/66 based semi-aromatic polyamide according to the invention with a melting temperature of 325° C.
PA-46 PA-46 based aliphatic polyamide according to the invention with a melting temperature of 290° C.
PA-66 PA-66 based aliphatic polyamide according to the invention with a melting temperature of 260° C.
Flame retardant Exolit OP1230, Clariant GmbH
Synergist ZnBorate
Glass Fibres Standard grade for thermoplastic polyamide compositions Compounding Flame retardant polyamide compositions were prepared on a twin screw extruder. For the compositions of Examples I-III and Comparative Experiments A, B and D, the temperature of the extruded melt was typically about 340° C., so well above 325° C. For Comparative Experiments the melt temperature was about 310° C. After the melt compounding the resulting melt was extruded into strands, cooled an cut into granules.

Infection Moulding

The flame retardant polyamide compositions were injection moulded into appropriate test moulds using a standard injection moulding machine. For the compositions of Examples I-III and Comparative Experiments C the settings were such that the melts of the compositions reached a temperature of about 310° C. For Comparative Experiments A, B and D, the settings were such that the melts of the compositions reached a temperature of about 340° C.

The compositions and test results have been summarized in Table 1.

It is noted that Comparative Experiments A, B and D could not be processed in a proper manner with a melt temperature much lower than 340° C., and certainly not below 325° C. The Examples I-III and Comparative Experiments C could be processed with a melt temperature above 325° C., but when processed at the conditions used for Comparative Experiments A, B and D this resulted in deteriorated products with bad properties.

TABLE 1 compositions and test results for Examples I-III and Comparative experiments A-D.

|  | Ex-I | EX-II | EX-III | CE-A | CE-B | CE-C | CE-D |
|---|---|---|---|---|---|---|---|
| Polyamides/weight ratio | | | | | | | |
| PPA | 70 | 60 | 60 | 90 | 80 | — | 100 |
| PA-46 | 30 | 40 | — | 10 | 20 | 100 | — |
| PA-66 | — | — | 40 | — | — | — | — |
| X-parameter | <0 | <0 | <0 | — | — | — | — |
| Composition (wt. %) | | | | | | | |
| Polyamide polymer | 48 | 48 | 48 | 48 | 48 | 42 | 48 |
| Glass Fibres | 30 | 30 | 30 | 30 | 30 | 30 | 30 |
| Exolit | 12 | 12 | 12 | 12 | 12 | 18 | 12 |
| ZnBorate | — | — | — | — | — | 4 | — |
| Performance rating *) | | | | | | | |
| Flow | + | + | +/− | +/− | +/− | +/− | = |
| Corrosion | +/− | +/− | +/− | +/− | +/− | +/− | − |
| Plate out | + | + | + | +/− | +/− | − | − |
| Weld strength | + | + | +/− | + | + | +/− | + |
| Flame retardancy (V0) | + | + | + | + | + | #) | ++ |
| Gloss (@ 120° C. mould temperature) | ++ | ++ | +/− | +/− | +/− | +/− | − |

*) ++ = very good, + = good, +/− = moderate; − = bad, = = very bad.
) despite high loading of flame retardants, only V2 rating was obtained.

The invention claimed is:

1. An injection molded part made of a flame retardant polyamide composition consisting of:
   (A)/(B) 30-90 wt. % of a polyamide (A) and a polyamide (B) in a weight ratio of the polyamide (A) to the polyamide (B) in a range between 55:45-72.5:27.5;
   (C) 5-25 wt. % of a metal(di)phosphinate;
   (D) 0-60 wt. % of inorganic fillers and/or fibrous reinforcing agents; and
   (E) 0-40 wt. % of other components; wherein
   the polyamide (A) is a semi-crystalline semi-aromatic polyamide having a melting temperature (TmA) in a range of 290-350° C. and a number average molecular weight (Mn-A) in a range between 10,000 and 30,000 g/mol; and
   the polyamide (B) is a semi-crystalline aliphatic polyamide having a melting temperature (TmB) in a range of 250-300° C. and a number average molecular weight (Mn-B) in a range between 7,500 and 50,000 g/m, and wherein
   the melting temperature TmA is higher than the melting temperature TmB.

2. The injection molded part according to claim 1, wherein the flame retardant polyamide composition consists of:
   (A)/(B) 30-87 wt. % of the polyamide (A) and the polyamide (B) in a weight ratio of the polyamide (A) to the polyamide (B) in the range between 55:45-72.5: 27.5;
   (C) 7.5-20 wt. % of the metal(di)phosphinate;
   (D) 5-55 wt. % of the inorganic fillers and/or fibrous reinforcing agents; and
   (E) 0.5-20 wt. % of the other components.

3. The injection molded part according to claim 1, wherein Mn-A is in the range of 10,000-25,000 g/mol and/or wherein Mn-B in the range of 10,000-40,000 g/mol.

4. The injection molded part according to claim 1, wherein the flame retardant system (C) comprises an aluminium (di)phosphinate.

5. The injection molded part according to claim 1, wherein the composition comprises at most 1 wt. % ZnBorate.

6. The injection molded part according to claim 1, wherein the composition comprises 5-25 wt. % of the metal(di)phosphinate (C), and 5-60 wt. % of the inorganic fillers and/or fibrous reinforcing agents (D), wherein the inorganic fillers and/or fibrous reinforcing agents (D) are glass or carbon reinforcement fibers, and wherein the wt. % is relative to total weight of the composition.

7. A plastic part for a connector which comprises the injection molded part according to claim 1.

8. A housing or a stiffener frame for an electronic device which comprises the injection molded part according to claim 1.

9. A process for producing injection moulded parts from a flame retardant polyamide composition comprising the steps of:
   (a) providing the flame retardant polyamide composition according to claim 1;
   (b) heating the flame retardant polyamide composition in an injection moulding machine to a temperature of at most 10° C. above TmA to form a polymer melt of the flame retardant polyamide composition; and
   (c) injection moulding the polymer melt by injecting the polymer melt into a mould to form the injection moulded part.

10. The process according to claim 9, wherein step (c) is practiced by injecting the polymer into the mould having a mould temperature of at least 100° C.

11. The process according to claim 10, wherein step (c) is practiced by injecting the polymer melt into the mould having a mould temperature in a range of 110-150° C.

* * * * *